(12) United States Patent
Almonte et al.

(10) Patent No.: US 8,863,015 B2
(45) Date of Patent: Oct. 14, 2014

(54) MULTI-MONITOR, MULTI-JVM JAVA GUI INFRASTRUCTURE WITH LAYOUT VIA XML

(75) Inventors: Nicholas A. Almonte, Bristol, RI (US); William R Stubbs, Fall River, MA (US)

(73) Assignee: Raytheon Company, Waltham, MA (US)

( * ) Notice: Subject to any disclaimer, the term of this patent is extended or adjusted under 35 U.S.C. 154(b) by 474 days.

(21) Appl. No.: 12/589,443

(22) Filed: Oct. 23, 2009

(65) Prior Publication Data

US 2010/0146505 A1    Jun. 10, 2010

Related U.S. Application Data

(63) Continuation of application No. 11/334,432, filed on Jan. 19, 2006, now abandoned.

(51) Int. Cl.
*G06F 3/048* (2013.01)
*G06F 9/44* (2006.01)

(52) U.S. Cl.
CPC .................................. *G06F 9/4443* (2013.01)
USPC ........... 715/767; 715/719; 715/735; 715/737; 715/742; 715/746; 715/761; 715/803

(58) Field of Classification Search
CPC .................. G06F 3/04886; G06F 3/04897
USPC ......... 715/735, 761, 719, 737, 742, 746, 767, 715/803
See application file for complete search history.

(56) References Cited

U.S. PATENT DOCUMENTS

| | | | | | |
|---|---|---|---|---|---|
| 4,694,396 | A | * | 9/1987 | Weisshaar et al. | 719/313 |
| 4,754,395 | A | * | 6/1988 | Weisshaar et al. | 719/313 |
| 4,787,026 | A | * | 11/1988 | Barnes et al. | 718/100 |
| 4,835,685 | A | * | 5/1989 | Kun | 710/260 |
| 4,914,583 | A | * | 4/1990 | Weisshaar et al. | 719/313 |
| 5,047,925 | A | * | 9/1991 | Kun et al. | 709/201 |
| 5,109,486 | A | * | 4/1992 | Seymour | 709/224 |
| 5,291,589 | A | * | 3/1994 | Matsuura et al. | 714/15 |
| 6,108,687 | A | * | 8/2000 | Craig | 709/203 |
| 6,262,695 | B1 | * | 7/2001 | McGowan | 345/1.1 |
| 6,266,056 | B1 | * | 7/2001 | Kanungo | 715/744 |

(Continued)

FOREIGN PATENT DOCUMENTS

| | | | | |
|---|---|---|---|---|
| CA | 2531887 A1 | * | 7/2006 | |
| WO | WO 2005057401 A1 | * | 6/2005 | G06F 3/14 |
| WO | WO 2006085158 A2 | * | 8/2006 | |

OTHER PUBLICATIONS

Ask Web Search, tcf multimodal workstation.*

(Continued)

*Primary Examiner* — Boris Pesin
*Assistant Examiner* — John Heffington
(74) *Attorney, Agent, or Firm* — Schwegman Lundberg & Woessner, P.A.

(57) ABSTRACT

A method and system are provided which allows enhanced support to graphical user interface (GUI) displays on multiple monitors. An extended markup language file provides code to configure each GUI. GUI software need not be re-compiled in order to implement changes in the layout of displays or to accommodate additional monitors. Potential display event handling delays are minimized by providing multiple Java Virtual Machines (JVMs) for GUIs. In one aspect, one JVM is provided for each GUI.

19 Claims, 3 Drawing Sheets

(56) References Cited

U.S. PATENT DOCUMENTS

| | | | |
|---|---|---|---|
| 6,351,272 B1* | 2/2002 | Kanungo | 715/764 |
| 6,380,955 B1* | 4/2002 | Kanungo et al. | 715/764 |
| 6,407,759 B1* | 6/2002 | Kanungo et al. | 715/809 |
| 6,543,011 B1* | 4/2003 | Schumacher et al. | 714/45 |
| 6,717,596 B1* | 4/2004 | Nason et al. | 715/788 |
| 6,829,772 B2* | 12/2004 | Foote et al. | 719/330 |
| 7,007,158 B1* | 2/2006 | Mahmoud | 713/1 |
| 7,111,303 B2* | 9/2006 | Macchiano et al. | 719/313 |
| 7,216,300 B2* | 5/2007 | Dang | 715/783 |
| 7,325,233 B2* | 1/2008 | Kuck et al. | 718/103 |
| 7,356,818 B2* | 4/2008 | Carollo et al. | 718/102 |
| 7,403,989 B2* | 7/2008 | Beringer et al. | 709/223 |
| 7,415,704 B2* | 8/2008 | Schmidt et al. | 717/166 |
| 7,441,233 B1* | 10/2008 | Orndorff et al. | 717/125 |
| 7,587,721 B2* | 9/2009 | Schmidt et al. | 719/319 |
| 7,596,791 B2* | 9/2009 | Wei et al. | 719/316 |
| 7,644,407 B2* | 1/2010 | Cowperthwaite et al. | 718/1 |
| 7,653,721 B1* | 1/2010 | Romanov et al. | 709/224 |
| 7,707,583 B2* | 4/2010 | Schmidt et al. | 719/312 |
| 7,797,293 B2* | 9/2010 | Pabla et al. | 707/705 |
| 7,870,153 B2* | 1/2011 | Croft et al. | 707/781 |
| 7,949,677 B2* | 5/2011 | Croft et al. | 707/781 |
| 7,954,150 B2* | 5/2011 | Croft et al. | 726/21 |
| 7,987,491 B2* | 7/2011 | Reisman | 725/112 |
| 8,010,679 B2* | 8/2011 | Low et al. | 709/227 |
| 8,028,040 B1* | 9/2011 | Hobbs et al. | 709/219 |
| 8,051,180 B2* | 11/2011 | Mazzaferri et al. | 709/227 |
| 8,099,395 B2* | 1/2012 | Pabla et al. | 707/661 |
| 8,112,513 B2* | 2/2012 | Margulis | 709/224 |
| 8,161,172 B2* | 4/2012 | Reisman | 709/228 |
| 8,640,035 B2* | 1/2014 | Pabla et al. | 715/758 |
| 2001/0029552 A1* | 10/2001 | Foote et al. | 709/330 |
| 2002/0030635 A1* | 3/2002 | McGowan | 345/5 |
| 2002/0089536 A1* | 7/2002 | Dang | 345/749 |
| 2002/0095396 A1* | 7/2002 | Frerking et al. | 707/1 |
| 2002/0120546 A1* | 8/2002 | Zajac | 705/37 |
| 2002/0120547 A1* | 8/2002 | Zajac | 705/37 |
| 2003/0041000 A1* | 2/2003 | Zajac et al. | 705/37 |
| 2003/0046441 A1* | 3/2003 | Rau et al. | 709/315 |
| 2003/0088604 A1* | 5/2003 | Kuck et al. | 709/1 |
| 2003/0110085 A1* | 6/2003 | Murren et al. | 705/26 |
| 2003/0154232 A1* | 8/2003 | Beringer et al. | 709/102 |
| 2003/0200254 A1* | 10/2003 | Wei | 709/203 |
| 2003/0231756 A1* | 12/2003 | Creamer et al. | 379/229 |
| 2003/0233486 A1* | 12/2003 | Creamer et al. | 709/227 |
| 2003/0233635 A1* | 12/2003 | Corrie | 717/124 |
| 2004/0015966 A1* | 1/2004 | MacChiano et al. | 718/1 |
| 2004/0044953 A1* | 3/2004 | Watkins et al. | 715/500 |
| 2004/0150649 A1* | 8/2004 | Moscovitch | 345/589 |
| 2004/0226041 A1* | 11/2004 | Smith et al. | 725/43 |
| 2004/0267866 A1* | 12/2004 | Carollo et al. | 709/200 |
| 2005/0015307 A1* | 1/2005 | Simpson et al. | 705/26 |
| 2005/0039183 A1* | 2/2005 | Romero et al. | 718/100 |
| 2005/0065951 A1* | 3/2005 | Liston et al. | 707/101 |
| 2005/0149206 A1* | 7/2005 | Krane | 700/17 |
| 2005/0183083 A1* | 8/2005 | Mathiske et al. | 718/1 |
| 2005/0198632 A1* | 9/2005 | Lantz et al. | 718/1 |
| 2005/0204126 A1* | 9/2005 | Watson | 713/150 |
| 2005/0210158 A1* | 9/2005 | Cowperthwaite et al. | 710/1 |
| 2005/0262181 A1* | 11/2005 | Schmidt et al. | 709/200 |
| 2005/0262493 A1* | 11/2005 | Schmidt et al. | 717/164 |
| 2005/0262512 A1* | 11/2005 | Schmidt et al. | 719/310 |
| 2005/0262549 A1* | 11/2005 | Ritt et al. | 726/1 |
| 2005/0283344 A1* | 12/2005 | Moscovitch | 702/189 |
| 2006/0069828 A1* | 3/2006 | Goldsmith | 710/100 |
| 2006/0146660 A1* | 7/2006 | Ikeda et al. | 369/30.13 |
| 2006/0200771 A1* | 9/2006 | Nielsen et al. | 715/738 |
| 2006/0236328 A1* | 10/2006 | DeWitt | 719/329 |
| 2006/0277089 A1* | 12/2006 | Hubbard et al. | 705/9 |
| 2006/0288301 A1* | 12/2006 | Hood et al. | 715/762 |
| 2006/0288404 A1* | 12/2006 | Kirshnan et al. | 726/5 |
| 2007/0018992 A1* | 1/2007 | Wong | 345/545 |
| 2007/0043701 A1* | 2/2007 | Klementiev et al. | 707/3 |
| 2007/0048084 A1* | 3/2007 | Jung et al. | 404/9 |
| 2007/0094676 A1* | 4/2007 | Fresko et al. | 719/330 |
| 2007/0124474 A1* | 5/2007 | Margulis | 709/226 |
| 2007/0136134 A1* | 6/2007 | Moscovitch | 705/14 |
| 2007/0150258 A1* | 6/2007 | Lister et al. | 704/2 |
| 2007/0159560 A1* | 7/2007 | Moscovitch | 349/11 |
| 2007/0180493 A1* | 8/2007 | Croft et al. | 726/2 |
| 2007/0186212 A1* | 8/2007 | Mazzaferri et al. | 718/1 |
| 2008/0141246 A1* | 6/2008 | Kuck et al. | 718/1 |
| 2008/0284676 A1* | 11/2008 | Moscovitch | 345/1.3 |
| 2009/0199177 A1* | 8/2009 | Edwards et al. | 718/1 |
| 2010/0100888 A1* | 4/2010 | Tene et al. | 718/104 |
| 2010/0146505 A1* | 6/2010 | Almonte et al. | 718/1 |

OTHER PUBLICATIONS

Ask Web Search, limux operating system.*
TISO Console Family -Multi-Modal Workstation, May 2005, SAIC.*
Ask Web Search, tiso console.*
TISO Console Family—Multi-Modal Workstation, Nov. 5, 2004, SAIC.*
Ask Search, http://www.ask.com/web?q=swing+event+queue &qsrc=0&o=0&l=dir.*
Java swing event queue, http://bugs.sun.com/bugdatabase/view_bug.do?bug_id=4480705, Jul. 17, 2001.*
Loy et al. JavaSwing2nd Nov. 20, 2002, O'Reilly Media, 2$^{nd}$ Edition.*
Litwak, Pure Java, Dec. 22, 1999, Sams.*
TISO-Console-Family-Multi-Modal-Workstation—May 2005.*
Ask-Search-q=tiso+console&qsrc=0&o=0&l=dir—Nov. 4, 2011.*
Ask-Search-q=tcf+multimodal+workstation&qsrc=19&o=0—Nov. 4, 2011.*
TISO-Console-Family-Multi-Modal-Workstation—Nov. 5, 2004.*
Ask-Search-qsrc=l&o=0&l=dir&q=limux+operating+syste—Nov. 5, 2011.*
Ask-Search-q=swing+event+queue&qsrc=0&o=0&l=dir—Apr. 21, 2012.*
http-www-kauss-org-stephan-swing-index-html-java-awt-swing-event-queue, May 6, 2006.*
http-bugs-sun-com-bugdatabase-view_bug-do-bug_id-4480705, Jul. 17, 2001.*
www_acronymnfinder_com Architecture%2c-Engineering-and-Co Feb. 15, 2014.*
bing search q=architecture+engineering+construct Feb. 15, 2014.*
com.vmware.ws.using multiple monitors 1 vm.*
com.vmware.ws.using multiple monitors 2+ vm.*
superuser-com multiple-monitors-with-vi May 2010.*
devhut-net daniel pineault virtual-pc-on-multiple-monitor Nov. 26, 2011.*
community-spiceworks-com dual-monitor-suppor Jul. 2009.*

\* cited by examiner

US 8,863,015 B2

MULTI-MONITOR, MULTI-JVM JAVA GUI INFRASTRUCTURE WITH LAYOUT VIA XML

RELATED APPLICATIONS

This application is a continuation of prior U.S. patent application Ser. No. 11/334,432 filed Jan. 19, 2006, now abandoned hereby incorporated by reference herein, and to which this application claims the benefit of and priority to under 35 U.S.C. §§119, 120, 363, 365, and 37 C.F.R. §1.55 and §1.78.

BACKGROUND OF THE INVENTION

The creation of Java graphics user interfaces (GUIs) (Java is a registered trademark of Sun®) that support a Multi-Modal Workstation (MMW), UNIX workstation or Personal Computer (PC), (all generally referenced herein as a MMW) having one or more monitors, is currently implemented with the Java Swing package. When Java was originally created, only the Abstract Windows Toolkit (AWT) library was available for working with graphics. This package contains a simple set of classes such as Buttons, TextField, Label and others. A more advanced set of classes is contained in the later introduced library called Swing. Swing, like AWT, is a package that also includes buttons, text fields, and other classes for providing window controls. Swing allows GUIs to be built using the Java Software Development Kit (SDK). The names of the Swing components start with the letter J, for example, JButton, JTextField, JLabel, and so on. A graphics user interface GUI produced using Java Swing can have a "look and feel" which is either that of a Java platform, the native platform, or a particular specified platform. For instance, the GUI can be constructed to display a Windows®-based format. (Windows is a registered trademark of Microsoft Corporation in the United States and other countries).

A Java virtual machine (JVM) is an abstract computing machine that is responsible for hardware and operating system independence. As with a real computing machine, the JVM has an instruction set and it manipulates various areas of memory at run time. A hallmark of the JVM is its small compiled code and its ability to protect users from malicious computer programs. The JVM is aware of a particular binary format and class file format without knowing the particulars of the programming language. The JVM can host a language so long as it can be expressed as a valid class file. Typically, a single JVM runs as a single process on a physical computer, workstation, etc. having one or more monitors.

Java GUIs that run on multiple monitors use a single event queue and processing thread for all of the displays on all of the monitors. Event handlers detect any action that a user takes while operating a GUI (each monitor provides a GUI). These actions include, but are not limited to, pressing a button, clicking a mouse, dragging or selecting a menu item, etc. Such actions will cause the JVM to handle (process) each singular event. As a result, no other event from the GUI in the MMW can be handled until processing of that single event is completed. Consequently, other parts of the GUI freeze while processing of the single event occurs.

The "freezing" of the GUI on MMW monitors in a system while an event handler is processing an event on a particular part of the GUI is a serious limitation presented by Java Swing for MMWs. To overcome this problem, spawning another thread to process potentially slow event handling code does not solve two large problems: namely, (1) all display updates must be done on the event queue thread, causing graphic intensive processes to still freeze all of the GUIs across all monitors; and (2) use of multiple threads cannot generally be applied to third party commercial-of-the-shelf (COTS) software products that may be integrated into the GUI. Developers usually have no knowledge of how COTS software is written.

In addition to the freezing of GUIs, another problem with Java Swing's single threaded nature is that GUIs cannot take advantage of multiple processors and therefore receive no performance enhancement if a multi-processor machine is used.

In MMW applications, the GUI is composed using many hierarchical containers, including the top level JFrame container which produces a display region that can occupy up to a single monitor's total display surface area, and further including 1 to N (N being an integer) embedded JPanels which produce display regions each sized and laid out such that they can fill the display region produced by the JFrame container. The container class and its subclasses are often referenced without distinction between the abstraction and the resulting display. Such will be the case herein. Consequently, for ease of description, the JFrame container and its subclasses will not always be distinguished from the display produced by the JFrame container. The hierarchy of the GUI is flexible enough to permit containers within containers. Defined by each JPanel, and displayed within the display region produced by a JPanel, are all of the display regions created by the supported widgets such as buttons, menus, pull-downs, scroll bars, etc., which create these physical manifestations on-screen by the same name. This hierarchy of containers and layouts along with complexity of managing them is made more difficult in the MMW system by the presence of multiple monitors.

Another requirement for MMW systems is the ability to dynamically change GUI displays. Evolving task requirements and rapid prototyping both require an easy to alter GUI layout despite the multiple display requirements of the MMW.

Changing the layout in a Java Swing GUI requires recompilation of the software that describes the GUI layout. In applications, particularly ones in which an operator changes function or those where he/she has to switch from monitoring data to modifying data, the GUI display must likewise change as a result of changes in the GUI software. To do so using Java Swing, this requires that the GUI code be recompiled.

A need exists to resolve the freezing and rigid GUI design problems that arise in MMW GUI systems. Until now, no adequate solution existed.

Figure 1:
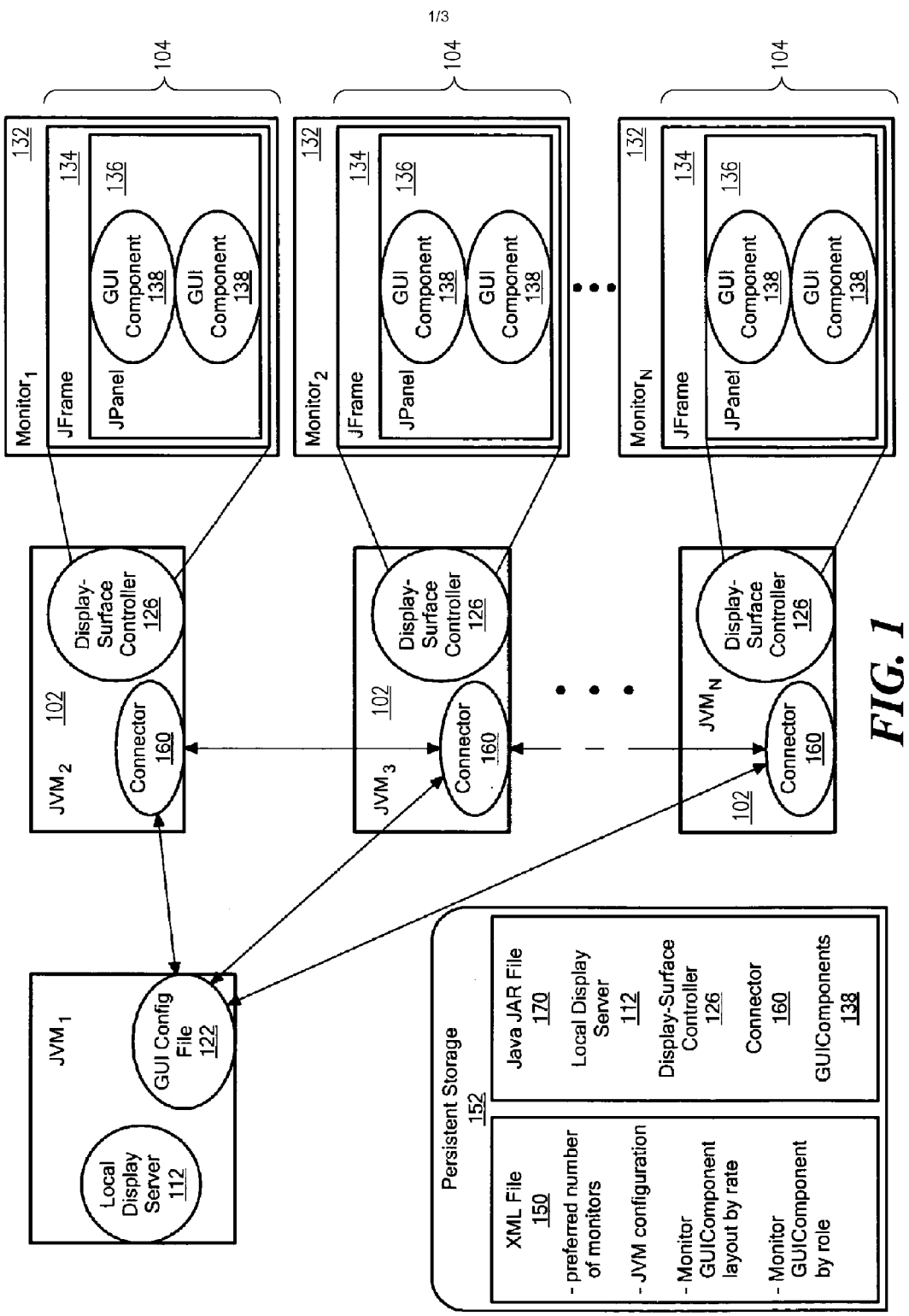
FIG. 1 is a diagram illustrating the GUI infrastructure for an MMW used in one embodiment of the invention to ground-truth document images in accordance with an embodiment of the present invention.

Applicable reference numerals have been carried forward.

DETAILED DESCRIPTION OF THE INVENTION

Event handling problems of the Java Swing single event queue are resolved, according to one embodiment of the invention, by using multiple JVMs in the MMW. Since the Java language does not allow custom or multiple Swing event queues within the same JVM, one way to get a separate event queue in a GUI is to use a separate JVM for each GUI. Additionally, using multiple JVMs removes the performance limitation of the "single event queue for an entire MMW" model by instead providing an event queue for each GUI. This approach is applicable for use with other languages other than Java which define a single event queue with respect to a GUI.

FIG. 1 illustrates a diagram of a GUI infrastructure used in a MMW having multiple monitors (i.e., displays). The hierarchical relationship of the containers are illustrated as described above with respect to Monitors 132 subscripted from 1 to N, (N being an integer), Jframe 134, and Jpanel 136. In one embodiment of the invention, one JVM 102 (also subscripted from 1 to N) is provided for each monitor supported by the MMW. Each display surface 104 is governed by a Display Surface Controller 126, a class that configures the display surface (arranges panels, pull down menus, buttons, etc.), manages displayed GUI Components 138, and disperses events to the GUI Components 138 it has loaded. Display Surface Controller 126, in essence, controls the configuration of a monitor associated with a particular JVM. GUI Components 138 are classes that implement the GUI Component Interface (not shown). The GUI Component Interface specifies a set of operations that all displays have to provide to in order to work with this GUI infrastructure.

In one aspect of the invention, the MMW is implemented by creating abstract constructs and instantiations of the GUI panels (i.e., creating GUI objects). Data is shared and passed throughout the overall GUI. It is not assumed that a particular GUI Component 138, as embodied by the present invention, is local with respect to another GUIComponent 138. The location (JVM, Monitor) of any particular GUI Component is specified in the GUI Config XML file 122 read by Local Display Server 112 at startup. Local Display Server 112 is a class that controls access to GUI Config XML file 122 and distributes event and configuration information to the other JVMs in the MMW system. The configuration chosen by Local Display Server 112 is passed to each Display Surface Controller 126 allowing it to set-up communication links to each of the other Display Surface Controllers 126 and Local Display Servers 112. The Display Surface Controller 126 is a class that controls the configuration of the monitor associated with a specific JVM. A helper class called Connector 160 handles the communications links. Connector 160 hides whether a communication link is to a remote JVM 102 or simply a reference to another "local" connector 160 in the same JVM 102. This allows GUI Components to send and receive GUI Events without ever needing to know how the GUI Event actually is transported. In one embodiment of the invention, connector 160, local display server 112, display surface controller 126 and GUI Component 138 are maintained in JAR file 170. JAR file 170 enables the bundling of multiple files into a single archive file. It offers the following advantages:

A) Contents of the JAR file can be digitally signed, allowing recognition of the signature and a grant of software security privileges based on the signature by users.

B) The class files and associated resources of a JAVA applet bundled in the JAR file can be downloaded to a browser in a single HTTP transaction without the need open a new connection for each file.

C) The JAR format allows compression of files contained therein for efficient storage.

D) JAR file formats allow adding extensions for software.

E) Packages stored in JAR files can be sealed, meaning that all classes defined in a package are found in the same JAR file.

F) Information pertaining to software vendor and version can be held in a JAR file.

G) JAR files are a standard part to the JAVA platform's core API.

All communication i.e. data, commands, etc. between GUI Components must be packaged in the form of a GUI Event. The GUI Event is a serializable base class that specific events extend to add their own fields while maintaining the ability for the class to be serialized and sent from one JVM to another. Communication is contemplated over various media including digital wireless systems, satellite systems, the Internet (e.g. using TCP/IP), the public switched telephone network (PSTN), public data switching network (e.g., ATM and SONET) (PDSN) etc. Consequently, according to one aspect of the invention, the location of an individual panel of a GUI, its associated JVM, the number of JVMs in use, the number of monitors in use or its location in the MMW (monitor location, pixel range, etc) are not defined until runtime of the software that describes the GUI layout. Moreover, with this GUI infrastructure in place, it is possible to construct a GUI containing panels whose location on a specific monitor or any number of monitors is defined at runtime with a separate event queue for each display surface. As a result, performance problems in one panel of the GUI are isolated to it's JVM only, allowing the other GUI panels of the other display surfaces and their associated JVMs to remain responsive and functional.

GUI software runs in the background of a display application. When screen buttons are pushed, pull-down menus selected, etc., these actions are treated as events in event driven software, such as Java Swing. With reference still to FIG. 1, in an aspect of the invention, GUI layouts are defined in an Extensible Markup Language (XML) file 150 maintained in persistent storage 152. Persistent storage 152 can represent the hard drive of a workstation, a database, or information received from a network from a remote server. In another aspect of the present invention, changes to the layout of GUI panels and other features of a display surface are accomplished by altering XML file 150. GUI software defining a display layout need only access or load XML file 150 to implement a change in the display layout. Defining GUI layouts in an XML file obviates the need to modify code and recompile software that describes the GUI layout when changes in the GUI layout are required. Once the change has been implemented, the GUI software need only be re-launched, rather than modified and recompiled as is the case with the what now represents the prior art and a more complicated and time consuming requirement. In addition, with each panels' location attributes described in an XML file, the layouts of the panels supporting multiple operator roles on the MMW become much easier to manage as the unique layout for each role is now maintained in an XML file and not hard-coded in GUI software. Pursuant to one of many possible schemes, XML file 150 is parsed by a JVM upon startup of a GUI. For instance, one of the JVMs can be chosen on the basis of which one is the first to be placed in operation. Accordingly, panels are organized across all of the available monitors appropriately. XML file 150 will list the number of screens to be used, which screen a particular panel will be located on, and the exact size and location of each panel.

The combination of panels laid out and organized according to that specified in an XML file together with a GUI infrastructure that supports multiple JVMs, thus eliminating the single Swing event queue problem of the Java GUI development or other similarly disposed programs, provides, in comparison with conventional systems, a multi-monitor display solution which requires less compilation time and more flexible support of different layouts required by various operator roles supported by a MMW system.

Figure 2:
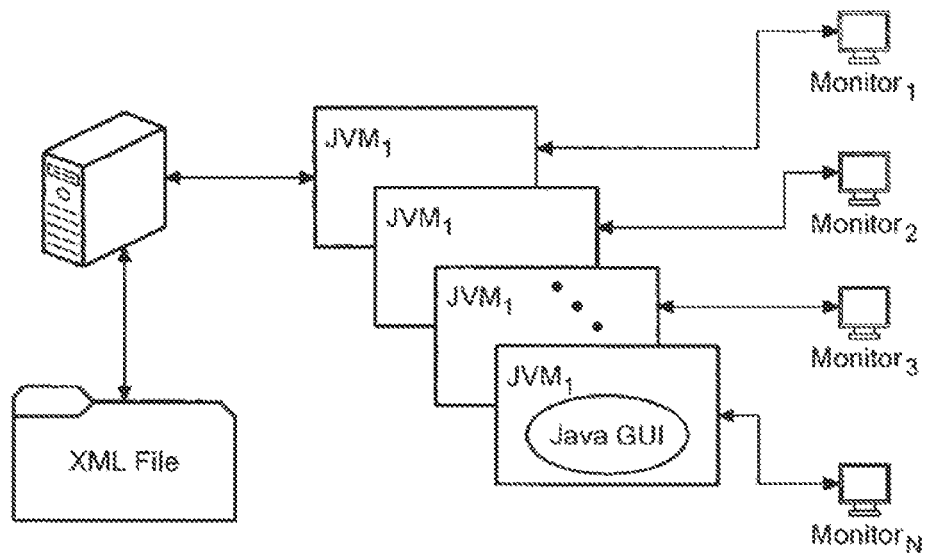
FIG. 2 illustrates a diagram of the Multi-Modal Workstation system.

FIG. 2 illustrates a graphical representation of one embodiment of the invention showing the one workstation used to create the multiple JVMs. In this embodiment of the invention, the GUI Config XML file can be resident in the permanent storage of the workstation or exist independently and reside in a remote location connected to the MMW by a communication link. In addition, FIG. 2 depicts up to N monitors supported by this embodiment of the invention.

Figure 3:
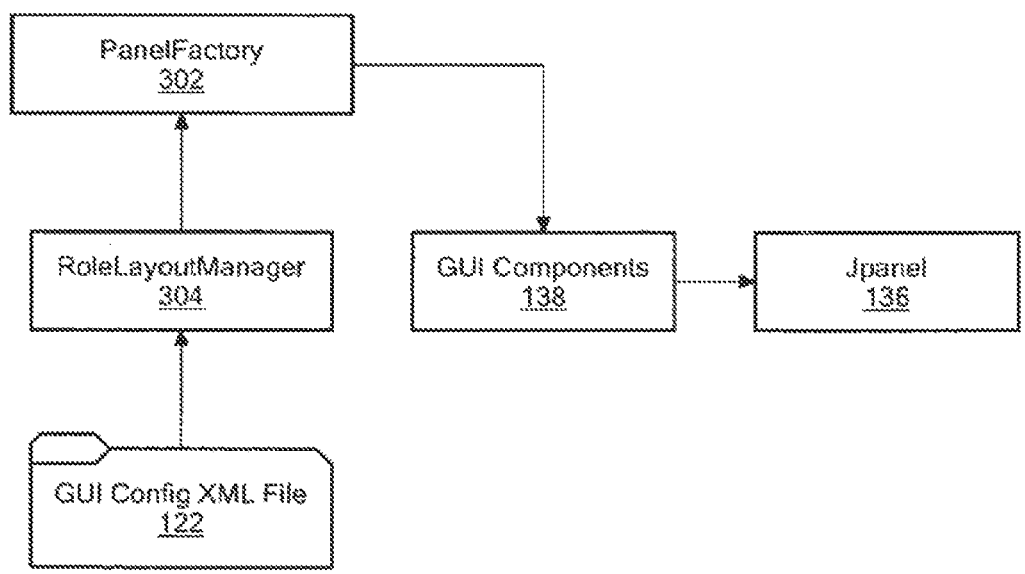
FIG. 3 graphically depicts the functional diagram of the DisplaySurfaceController.

FIG. 3 is a diagram which details one embodiment of Display Surface Controller 126, which is responsible for loading and layout of panels for its display surface. Display Surface Controller 126 accomplishes this task through the use of two helper classes: Role Layout Manager 304 and Panel Factory 302. Role Layout Manager 304 selects the appropriate panel layout for the role as specified in the XML file (GUIConfig XML file 122) defining a class specifying the GUI configuration for the specific display based on the number of monitors selected by Local Display Server 112 (shown in FIG. 1) at startup. Role Layout Manager 304 causes each GUI Component 138 to add itself to an empty JPanel 310 that Role Layout Manager 304 has created, located and sized based on the layout specified in the GUI Config XML file 122 for the specific GUI Component 308. By having the GUI Component 308 add itself to the newly created empty JPanel 136 allows the GUI Component 138 to perform any necessary internal resizing or look and feel change based on the size or position of where it will be displayed.

Role switches are performed by moving all of the currently loaded GUI Components 138 to a cache (not shown). As the new role's layout is created, the cache is checked for an already constructed GUI Component of a specific type before a new layout is loaded. After the role switch is complete, all GUI Components 138 left in the cache are asked to unregister for events and then are destroyed by the JVM Garbage Collector (not shown). The JVM Garbage Collector is a package provided by the Java SDK. By using the caching mechanism, GUI Components that are common to multiple roles do not have to be reloaded every time a role switch occurs.

Figure 4:
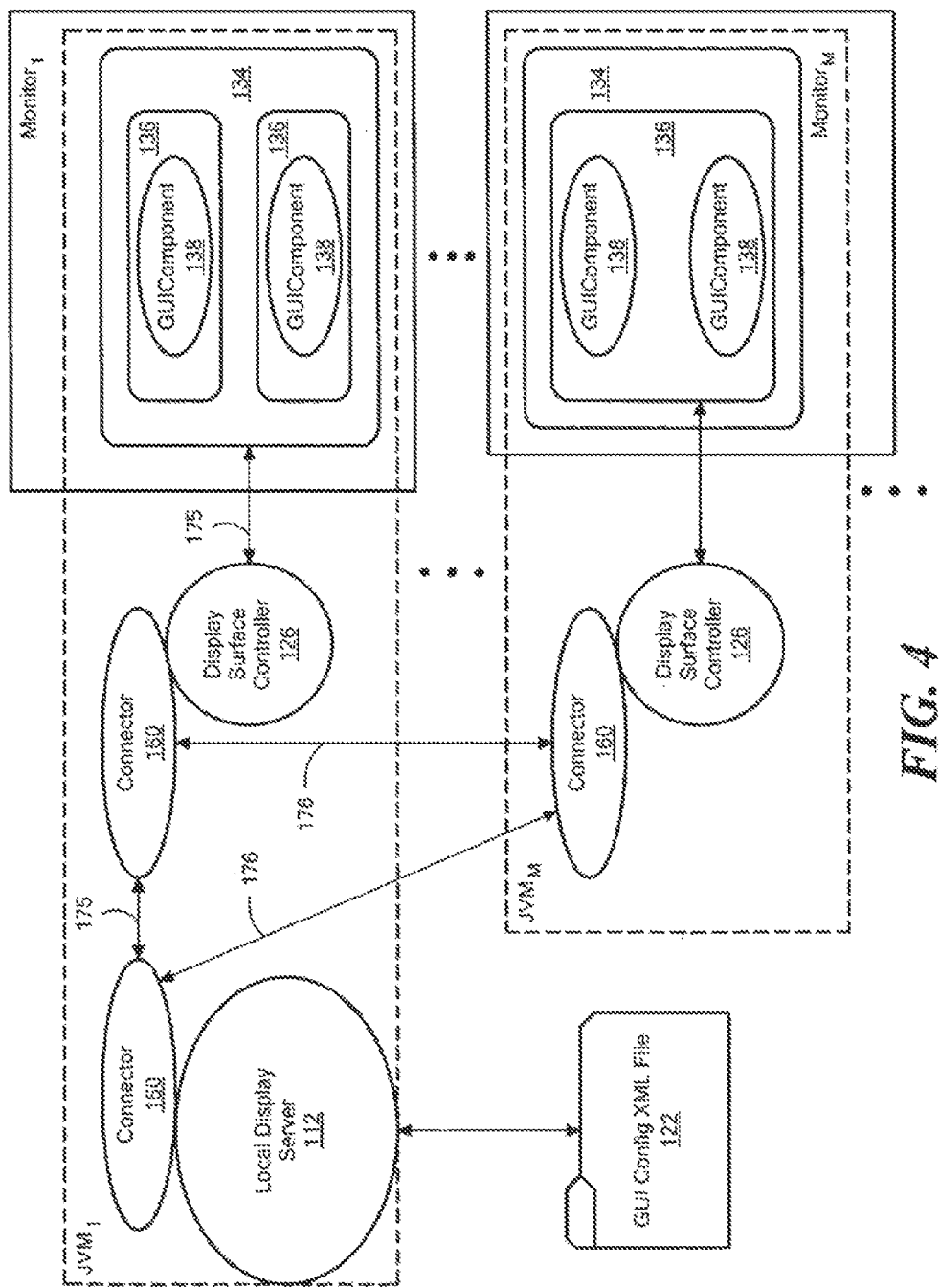
FIG. 4 is a diagram illustrating an embodiment of the invention depicting an MMW system flow where the display of one monitor's display is initialized.

FIG. 4 is a diagram illustrating a framework, according to the invention, with respect to Monitors 1 through Monitors$_M$ (M representing the index of the JVM). During startup, Local Display Server 112 loads GUI Config XML 122. Local Display Server 112 starts the number of JVMs specified in GUI Config XML 122 and instantiates Display Surface Controller 126 in the JVM for each display surface specified in the XML. The configuration and GUI layout chosen by the Local Display Server 112 is passed to each Display Surface Controller 126. This configuration allows the Display Surface Controller 126 to set up communication links with each of the other Display Surface Controllers 126 and Local Display Server 112. A helper class called Connector 160 handles all internal JVM and external JVM communication links, indicated by double arrow 176. All incoming and outgoing GUI Events pass through the Connector 160. GUI Components 308 have access to Connector 160 via Display Surface Controller 126, indicated by double arrow 175. Display Surface Controller 126 creates JPanels 136 according to the GUI Layout provided by Local Display Server 112.

The foregoing invention has many applications, particularly in the fast paced world of commodities trading. For instance, traders could be provided with monitors that would display up-to-date information on selected commodities. One or more such monitors could be provided access to information allowing input for selecting call or put options based on feedback from the market. A multi-monitor, multi JVM system would offers increased flexibility and lower operational cost as compared with current systems. Another application within the existing infrastructure of the Internet, would be to provide a workstation for presenting data across boundaries defined by language or nation. Consequently, each monitor is the system could present rapidly changing market information while uniquely being configured according to language and/or presentation requirements.

The foregoing multi-monitor, multi-JVM system additionally has far ranging applications to gaming, particularly video gaming. One gaming application exists for a game requiring a coherent display across a multiple monitors. This includes, for example, games presenting a view into a virtual world. These games could leverage the power of multiple machines with separate monitors. The multi-monitor, mult-JVM system can provide its users multiple and different views of the virtual world simultaneously as a coherent display across all of the users' monitors, while still allowing an individual user to maintain control from a single point. This offers low operational cost and flexibility as compared with competing systems. This application is particularly well suited for use with games and gaming systems where players require a number of different views simultaneously and where they must act upon the information presented.

Yet another application for the multi-monitor, multi-JVM system according to the invention applies to the banking, lending and real estate industries. While perhaps not needing information at a rate as fast as the commodities industries, one implementation for the invention would be to provide multiple monitors presenting simultaneous streams of information. For example, lending offers could adjust loan rates to compete with products from banks or institutions where insurance, home mortgages or certificates of deposit (CDs) are sold using monitors displaying this information within a system according to the invention. In addition, applications of this sort can also be provided in a closed environment offering security with controlled access to important data-a vital component of financial systems.

The foregoing invention is also well-suited for offering displays tailored to a particular language. A MMW according to the invention can easily support, for instance, several multi-monitor GUIs, each having displays according to different languages, e.g. English, Swedish, Russian, German, Japanese, Chinese, etc.

Although the invention herein has been described with reference to particular embodiments, it is to be understood that these embodiments are merely illustrative of the principles and applications of the present invention. For instance, Microsoft®'s C Sharp is contemplated as a programming language for use with the invention. It is therefore to be understood that numerous modifications may be made to the illustrative embodiments and that other arrangements may be devised without departing from the spirit and scope of the present invention as defined by the appended claims.

What is claimed is:
1. A computing system comprising:
   a plurality of graphical user interfaces for a plurality of monitors;
   a plurality of Java Virtual machines (JVMs), one Java Virtual Machine (JVM) for each graphical user interface;
   a plurality of event queues, one event queue for each graphical user interface to allow a performance problem on one JVM to be isolated to the one JVM, wherein events are indicative of a user action on a respective graphical user interface;

a computer programmed with a file including a class that directly distributes event and configuration information to the plurality of JVMs, the file including graphical user interface display information for configuration of visual content on the plurality of monitors, wherein the file defines a role for each graphical user interface and a layout for each graphical user interface, wherein each role corresponds to a set of graphical user interface components, wherein the computer is programmed such that when a role in the file is changed to a new role, the respective graphical user interface is updated with the new role so that components common to the new role and previous role of the graphical user interface do not have to be reloaded, and wherein, when a layout in the file is changed, the change in the graphical user interface corresponding to the change in the file is configured to be implemented by re-launching the graphical user interface.

2. A computing system as recited in claim 1 wherein the computer comprises a workstation.

3. A computing system as recited in claim 1 wherein the computer comprises a multi-modal workstation.

4. A method of supporting multiple displays by a multi-modal computing system comprising:

providing a Graphical User Interface (GUI) configuration file for a computer used in connection with a workstation providing selected graphical user displays to a plurality of monitors;

providing a plurality of JVMs for the plurality of monitors;

parsing the file in connection with providing GUIs on the monitors;

providing a plurality of event queues, one event queue for each GUI to allow a performance problem on one JVM to be isolated to the one JVM, wherein events are indicative of a user action on a respective GUI;

distributing event and configuration information directly to the plurality of JVMs, the file including graphic user display information for configuration of visual content on the plurality of monitors, wherein the file defines a role for each GUI, and wherein each role corresponds to a set of GUI components;

in response to a role in the file being changed to a new role, updating the respective GUI with the new role so that components common to the new role and the previous role do not have to be reloaded; and in response to the graphic user display information in the file being changed, the change in the GUI corresponding to the change in the file is configured to be implemented by re-launching the GUI.

5. A method of supporting multiple displays as recited in claim 4 wherein JVMs are provided to monitors on a maximum one-to-one basis.

6. A method of supporting multiple displays as recited in claim 4 wherein the file consists of an XML file that may be parsed by a Java or C-Sharp implementation.

7. A method as recited in claim 4 wherein the monitors display information according to a language of choice.

8. A computing system as recited in claim 1 wherein a one-to-one correspondence exist between Java Virtual Machines and monitors.

9. A computing system as recited in claim 3 wherein the workstation may be a multiprocessor workstation.

10. A computing system as recited in claim 1, wherein the graphic user display information is parsed by a first JVM that is put into operation, and the first JVM that is put into operation controls access to the graphic user display information.

11. A computing system as recited in claim 1, wherein the configuration information comprises the exact size and location of one or more GUI panels.

12. A computing system as recited in claim 1, wherein each of the plurality of JVMs comprises a helper class, which enables communication between other JVMs.

13. A computing system as recited in claim 1, wherein the event queue is a software component.

14. A computing system as recited in claim 13, wherein the event queue is a Java Swing event queue.

15. A computing system as recited in claim 3 wherein the XML file defines a layout of a plurality of GUIs, each GUI associated with a monitor and the GUIs being capable of operating independently from one another.

16. A computing system as recited in claim 3 wherein the XML file is comprised of GUI layout information and is capable of being changed without the need to re-compile Multi-Monitor Multi-JVM Java GUI code in connection with GUI layout modifications to the system.

17. A computing system as recited in claim 3 wherein the computer is programmed according to a language selected from java and C Sharp.

18. A computing system as recited in claim 3 wherein the file is an extended markup language (XML) file.

19. A computing system as recited in claim 18 wherein the XML file defines the number of JVMs to be started by the system.

* * * * *